(12) United States Patent
Demir et al.

(10) Patent No.: US 11,044,051 B2
(45) Date of Patent: Jun. 22, 2021

(54) ADAPTIVE GUARDS FOR MIXED NUMEROLOGY SYSTEMS AND ASSOCIATED METHOD OF USE

(71) Applicant: University of South Florida, Tampa, FL (US)

(72) Inventors: Ali Fatih Demir, Tampa, FL (US); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 54 days.

(21) Appl. No.: 16/550,512

(22) Filed: Aug. 26, 2019

(65) Prior Publication Data
US 2019/0379488 A1   Dec. 12, 2019

Related U.S. Application Data

(63) Continuation-in-part of application No. 16/024,051, filed on Jun. 29, 2018, now Pat. No. 10,411,819.

(60) Provisional application No. 62/563,935, filed on Sep. 27, 2017.

(51) Int. Cl.
| | |
|---|---|
| H04L 1/16 | (2006.01) |
| H04B 17/336 | (2015.01) |
| H04L 5/00 | (2006.01) |
| H04L 27/26 | (2006.01) |
| H04B 7/0456 | (2017.01) |

(52) U.S. Cl.
CPC ......... *H04L 1/1642* (2013.01); *H04B 7/0478* (2013.01); *H04B 17/336* (2015.01); *H04L 5/0007* (2013.01); *H04L 27/2607* (2013.01)

(58) Field of Classification Search
CPC ...... H04L 5/0007; H04L 5/005; H04B 7/0478
See application file for complete search history.

(56) References Cited

U.S. PATENT DOCUMENTS

| | | | |
|---|---|---|---|
| 9,106,324 B1 | 8/2015 | Mahmoud et al. | |
| 9,426,010 B1 | 8/2016 | Mahmoud et al. | |
| 10,411,819 B1* | 9/2019 | Demir ................. | H04B 17/336 |
| 2017/0303274 A1 | 10/2017 | He et al. | |
| 2017/0366311 A1* | 12/2017 | Iyer ..................... | H04B 7/0482 |

(Continued)

OTHER PUBLICATIONS

Mahmoud and Arslan. Sidelobe Suppression in OFDM-Based Spectrum Sharing Systems Using Adaptive Symbol Transition. IEEE Communications Letters. 2008. vol. 12 (No. 2): 133-135.

(Continued)

*Primary Examiner* — Raj Jain
(74) *Attorney, Agent, or Firm* — Smith & Hopen, P.A.; Molly L. Sauter (57) ABSTRACT

A system and method for reducing the OFDM out-of-band emissions (OOBE) and Inter-Numerology Interference (INI) in a mixed-numerology OFDM-based system by utilizing a transmitter windowing operation that smooths the inherent rectangular pulse shape of the OFDM signals. The technique retains the main design of the OFDM receivers and provides backward compatibility for the existing OFDM-based systems. The guard band and the multi-window parameters that control the guard duration are jointly optimized regarding the numerology, the use case and the power offset between the users. To fully exploit and further increase the potential of adaptive guards, an interference-based scheduling algorithm is proposed as well.

18 Claims, 7 Drawing Sheets

(56) References Cited

U.S. PATENT DOCUMENTS

2018/0049064 A1* 2/2018 Li .................. H04W 24/02
2018/0198649 A1* 7/2018 Lindoff ............ H04L 5/0028
2019/0379488 A1* 12/2019 Demir ............. H04J 11/003

OTHER PUBLICATIONS

Malik et al., Reduction of Out of Band Radiation Using Modified Constellation Expansion in OFDM based Cognitive Radios. International Journal of Computing and Network Technology. 2016. vol. 4 (No. 2): 75-79.

Rathinakumar et al., CPRecycle: Recycling Cyclic Prefix for Versatile Interference Mitigation in OFDM based Wireless Systems. CoNEXT '16. 2016. 67-81.

Guvenkaya et al., A Windowing Technique for Optimal Time-Frequency Concentration and ACI Rejection in OFDM-Based Systems. IEEE Transactions on Communications. 2015. vol. 63 (No. 12): 4977-4989.

\* cited by examiner

ADAPTIVE GUARDS FOR MIXED NUMEROLOGY SYSTEMS AND ASSOCIATED METHOD OF USE

CROSS-REFERENCE TO RELATED APPLICATIONS

This application claims priority to currently pending U.S. patent application Ser. No. 16/024,051, filed on Jun. 29, 2018, and entitled "SYSTEM AND METHOD FOR ADAPTIVE OFDM GUARD BANDS", which claims priority to U.S. Provisional Application No. 62/563,935, filed on Sep. 27, 2017, and entitled "SYSTEM AND METHOD FOR ADAPTIVE OFDM GUARD BANDS", both of which are incorporated by reference in their entirety.

BACKGROUND OF THE INVENTION

Figure 1:
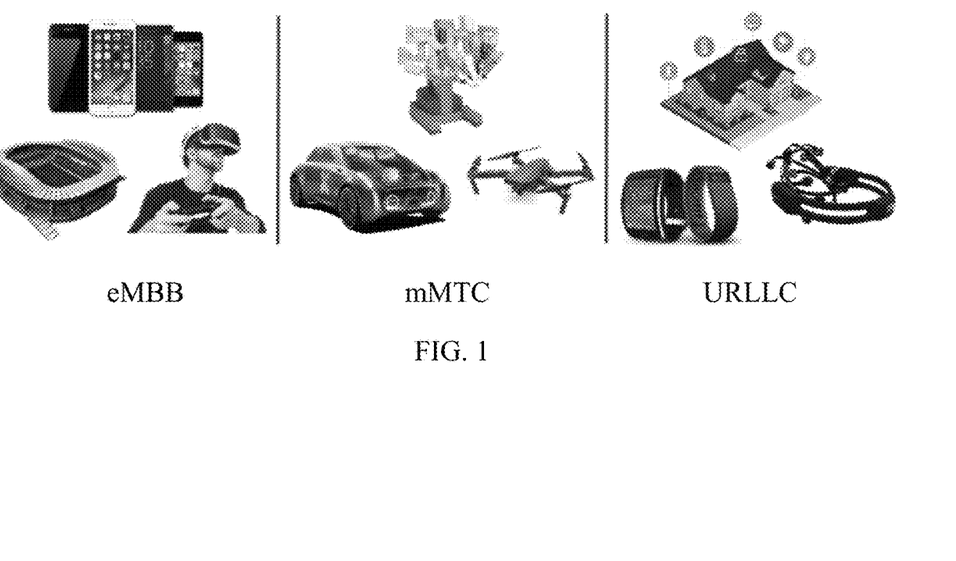
FIG. 1 illustrates various κG use cases, including Enhanced Mobile Broadband (eMBB), Massive Machine Type Communications (mMTC) and Ultra-Reliable Low-Latency Communications (URLLC), which may be combined in a mixed-numerology system in accordance with the present invention.

The next generation wireless communication technologies are envisioned to support a diverse service variety under the same network. As a recent example, the International Telecommunications Union (ITU) has defined the main use cases that are going to be supported in the fifth generation (5G) mobile network as enhanced mobile broadband (eMBB), massive machine type communications (mMTC), and ultrareliable low-latency communications (URLLC) as shown in FIG. 1. The applications which demand high data rate and better spectral efficiency fall into the eMBB category, whereas the ones which require ultra-high connection density and low power consumption fall into the mMTC category. Commonly, the industrial sensors and medical implants should operate for many years without a maintenance need, and accordingly, high energy efficiency and low device complexity are important for these mMTC services. Moreover, the mission-critical applications such as remote surgery or self-driving vehicles are categorized in URLLC. A flexible air interface is needed to meet these demanding service requirements under various channel conditions and system scenarios. Hence, the waveform, which is the main component of any air interface, must be designed precisely to facilitate such flexibility.

Orthogonal frequency-division multiplexing (OFDM) is the most popular waveform that is currently being used in various standards such as 4G LTE and the IEEE 802.11 family. OFDM provides several tempting features such as efficient hardware implementation, low-complexity equalization, and easy multiple-input-multiple-output (MIMO) integration. On the other hand, OFDM seriously suffers from its high out-of-band emissions (OOBE), peak-to-average power ratio (PAPR), and strict synchronization requirement. In addition, 4G LTE adopted a uniform OFDM parameter configuration in pursuit of orthogonality and cannot serve different needs efficiently. Although numerous waveforms have been proposed considering all these disadvantages for the upcoming 5G standard, OFDM remains as the waveform of the new radio with a flexible waveform parametrization (a.k.a. numerology). The flexibility parameters include but are not limited to CP rate, subcarrier spacing, and window/filter parameters.

The channel conditions, use cases, and system scenarios are the most critical considerations for the numerology design. For instance, a time-localized pulse shape is preferable for time-dispersive channels (i.e., high delay spread scenario), while a frequency-localized pulse shape is more suitable for frequency-dispersive channels (i.e., high Doppler spread scenario). Particularly, the frequency domain localization is crucial for asynchronous transmissions across adjacent sub-bands. Another degree of freedom, the subcarrier spacing in OFDM systems, should be kept large to handle the Doppler spread in a highly mobile environment. On the other hand, a smaller subcarrier spacing provides a longer symbol duration and decreases the relative redundancy that is allocated for time dispersion. The reduced redundancy is especially important for the eMBB services. Furthermore, reliability and latency are vital for mission-critical communications where errors and retransmissions are less tolerable. Thus, a strict frequency localization and a short symbol duration (i.e., large subcarrier spacing) are more practical for the URLLC applications. Also, mMTC operates at a low power level to save energy and might seriously suffer from interference in an asynchronous heterogeneous network. Therefore, a more localized pulse shape in the frequency domain is more suitable in this case.

An efficient numerology design ensures better utilization of spectral resources and will be one of the core technologies to embrace diverse requirements in the new radio. However, managing the coexistence of multiple numerologies in the same network is challenging. Although OFDM numerologies are orthogonal in the time domain, any mismatch in parametrization, such as subcarrier spacing, leads to inter-numerology interference (INI) in the frequency domain. Typically, the interference level is managed by various windowing/filtering approaches along with the guard allocation. The windowing/filtering operations reduce the OOBE, but they need an extra period which extends the guard duration between the consecutive OFDM symbols. Also, additional guard bands are still required between adjacent channels to deal with the INI. In other words, better interference mitigation is realized with the cost of reduced spectral efficiency. Accordingly, the future communication systems have to optimize the guards in both time and frequency domains to improve the spectral efficiency.

Accordingly, what is needed in the art is an improved system and method for reducing inter-numerology interference (INI) in an OFDM-based communication system employing mixed numerology.

SUMMARY OF INVENTION

In various embodiments, the present invention provides a system and method utilizing adaptive guards along with a multi-window operation to solve the INI issue that exists in mixed-numerology based OFDM-based communication systems.

This present invention also improves the spectral efficiency of a communication system which supports a variety of services operating asynchronously under the same network.

In one embodiment, the present invention provides a method for improved OFDM signal transmission in a multi-user OFDM communication system. The method includes, identifying a numerology of a plurality of users, identifying a power offset (PO) between a plurality of users operating in adjacent bands of an OFDM-based communication system, identifying a required signal-to-interference ratio (SIR) for the plurality of users. The method further includes, optimizing a guard band for each of the plurality of users based upon the identified power offset, the identified required signal-to-interference ratio (SIR) and the identified numerology for each of the plurality of users. The method further includes optimizing a guard duration for each of the plurality of users based upon the identified power offset, the identified required signal-to-interference ratio (SIR) and the identified numerology for each of the plurality of users and further generating an OFDM signal based using the optimized guard bands and optimized guard duration for each of the plurality of users.

In a particular embodiment, the method further includes utilizing a multi-window approach in an asymmetric interference scenario to manage each side of the spectrum independently, thereby further decreasing the require guards in time and frequency domains.

The method may further include, performing interference-based scheduling for each of the plurality of users prior to generating the OFDM signal, wherein performing interference-based scheduling for each of the plurality of users may further include grouping users with similar received power levels, similar signal-to-interference ratios (SR) and similar numerologies adjacent to each other.

In an additional embodiment, the present invention provides an apparatus comprising one or more integrated circuit devices which may be configured to receive a data symbol vector comprising data mapped to a subcarrier associated with one of a plurality of users operating in adjacent bands of an OFDM-based communication system. The integrated circuit devices may further be configured to identify a numerology of the plurality of users, to identify a power offset (PO) between the plurality of users operating in adjacent bands of the OFDM-based communication system, to identify a required signal-to-interference ratio (SIR) for the plurality of users. The integrated circuit devices may further be configured to optimize a guard band for each of the plurality of users based upon the identified power offset, the identified required signal-to-interference ratio (SIR) and the identified numerology for each of the plurality of users, to optimize a guard duration for each of the plurality of users based upon the identified power offset the identified required signal-to-interference ratio (SIR) for each of the plurality of users and to generate an OFDM signal based using the optimized guard bands and optimized guard duration for each of the plurality of users.

The one or more integrated circuit devices of the apparatus may further be configured to perform interference-based scheduling for each of the plurality of users prior to generating the OFDM signal.

In another embodiment, the present invention provides a non-transitory computer readable storage medium having computer program instructions stored thereon that, when executed by one or more processors, cause the one or more processors to perform a method of generating an orthogonal frequency division multiplexing (OFDM) symbol for transmission in a communication channel using adaptive guard bands and adaptive guard durations. The method performed may include, receiving a data symbol vector comprising data of a plurality of users operating in adjacent bands of an OFDM-based communication system, identifying a numerology of the plurality of users, identifying a power offset (PO) between the plurality of users operating in the adjacent bands of the OFDM-based communication system, identifying a required signal-to-interference ratio (SIR) for each of the plurality of users, optimizing a guard band for each of the plurality of users based upon the identified power offset the identified required signal-to-interference ratio (SIR) for each of the plurality of users, optimizing a guard duration for each of the plurality of users based upon the identified numerology, identified power offset and the identified required signal-to-interference ratio (SIR) for each of the plurality of users and generating a first OFDM signal based using the optimized guard bands and optimized guard duration for each of the plurality of users.

The method implemented by the non-transitory computer readable storage medium may further include, grouping users with similar numerologies, similar received power levels and similar signal-to-interference ratios (SR) adjacent to each other to improve the spectral efficiency of the transmission.

Accordingly, the present invention provides an improved system and method for reducing the out-of-band emissions (OOBE) of the subcarriers (users) in a mixed-numerology OFDM-based communication system utilizing adaptive guard bands and guard duration, and interference-based scheduling.

In various embodiments, the present invention illustrates the significance of adaptive guards considering a windowed-OFDM system which supports a variety of services operating asynchronously under the same network. The windowing approach of the present invention requires a guard duration to suppress the out-of-band emissions (OOBE), and a guard band is required to handle the adjacent channel interference (ACI), along with the windowing. The guards in both time and frequency domains are optimized with respect to the use case and power offset between the users. To fully exploit and further increase the potential of adaptive guards, an interference-based scheduling algorithm is proposed as well.

The results show that the precise design that facilitates such flexibility reduce the guards significantly and boost the spectral efficiency.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In various embodiments, the present invention addresses the significance of adaptive guards considering an OFDM-based system which supports a variety of numerologies operating asynchronously under the same network.

In the present invention, the OOBE is reduced with a transmitter windowing operation that smooths the inherent rectangular pulse shape of OFDM. The windowing approach preserves the essential structure of the OFDM receivers and provides backward compatibility for the current OFDM-based systems. The guard band and the window parameters that handle the guard band duration are optimized jointly regarding the subcarrier spacing, use case, and power offset between the numerologies. Also, the multi-window technique provides managing each side of the spectrum independently in the case of an asymmetric interference scenario. Since the allowed interference level depends upon the numerologies operating in the adjacent bands, the potential of adaptive guards is further increased and exploited with an interference-based scheduling algorithm. The propose approach allocates the numerologies to the available bands considering the INI and decreases the need for guards.

Although various windowing approaches have previously been proposed to provide better spectral concentration, the present invention improves the art by additionally: (1) identifying key parameters for guard allocation considering a mixed numerology system, (2) jointly optimizing guards in both time and frequency domains with respect to the subcarrier spacing, use case and power offset between the numerologies and (3) providing an interference based scheduling algorithm to decrease the need for guards.

Figure 2:
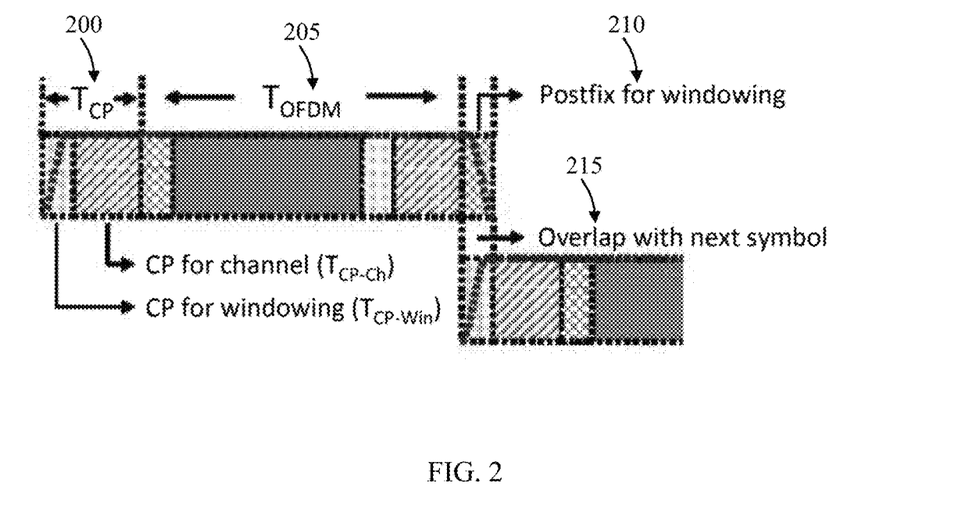
FIG. 2 is an illustration of the transmitter windowing operation and the guard duration allocation, in accordance with an embodiment of the present invention.

Consider a multiuser pulse-shaped OFDM system where asynchronous numerologies operate in the same network. Each numerology can serve multiple synchronous user equipments (UEs). The numerologies, which have different subcarrier spacing, power level, and use case (i.e. service requirements), perform a transmitter windowing operation to reduce their OOBE level and manage interference to the numerologies operating in adjacent bands. The guard duration that is allocated for the time-dispersive channel (i.e., $T_{CP-Ch}$) is fixed, and it is adequate to deal with the inter-symbol interference (ISI). Also, an extra guard duration is needed for windowing operation. Various windowing functions have been compared thoroughly in previous works, with different trade-offs between the main lobe width and the side lobe suppression. The optimal windowing function is outside the scope of the invention, and a raised-cosine (RC) window is utilized due to its low computational complexity and widespread use in the literature. The RC window function is formulated by the following equation:

$$g[n] = \begin{cases} \frac{1}{2} + \frac{1}{2}\cos\left(\pi + \frac{\pi n}{\alpha N_T}\right) & 0 \leq n \leq \alpha N_T \\ 1 & \alpha N_T \leq n \leq N_T \\ \frac{1}{2} + \frac{1}{2}\cos\left(\pi - \frac{\pi n}{\alpha N_T}\right) & N_T \leq n \leq (\alpha+1)N_T \end{cases} \quad (1)$$

Where α is the roll-off factor (0≤α≤1) and $N_T$ denote the symbol length. The roll-off factor (α) handles the taper duration of the RC window function. As α increases, the OOBE decreases with the cost of increased redundancy. The transmitter windowing operation is shown in FIG. 2. Initially, the cyclic prefix (CP) 200 that is designated to handle ISI (Inter Symbol Interference) is extended on both edges of the OFDM symbol 205, and afterwards, the extended part from the beginning of the symbol 210 is added to the end. The transition parts (i.e., ramp-ups and ramp-downs) of adjacent symbols are overlapped 215 to reduce the time-domain overhead emerging from the windowing operation.

However, the windowing operation is not enough to manage the inter-numerology interference (INI), and non-negligible guard bands are still required. However, the total amount of guard band (GB) or the length of guard duration (GD) which is needed for the windowing operation depends on the subcarrier spacing of the interference source, the required signal to interference ratio (SIR) level of the numerology in its adjacent bands, and the power offset (PO) between them.

Figure 3:
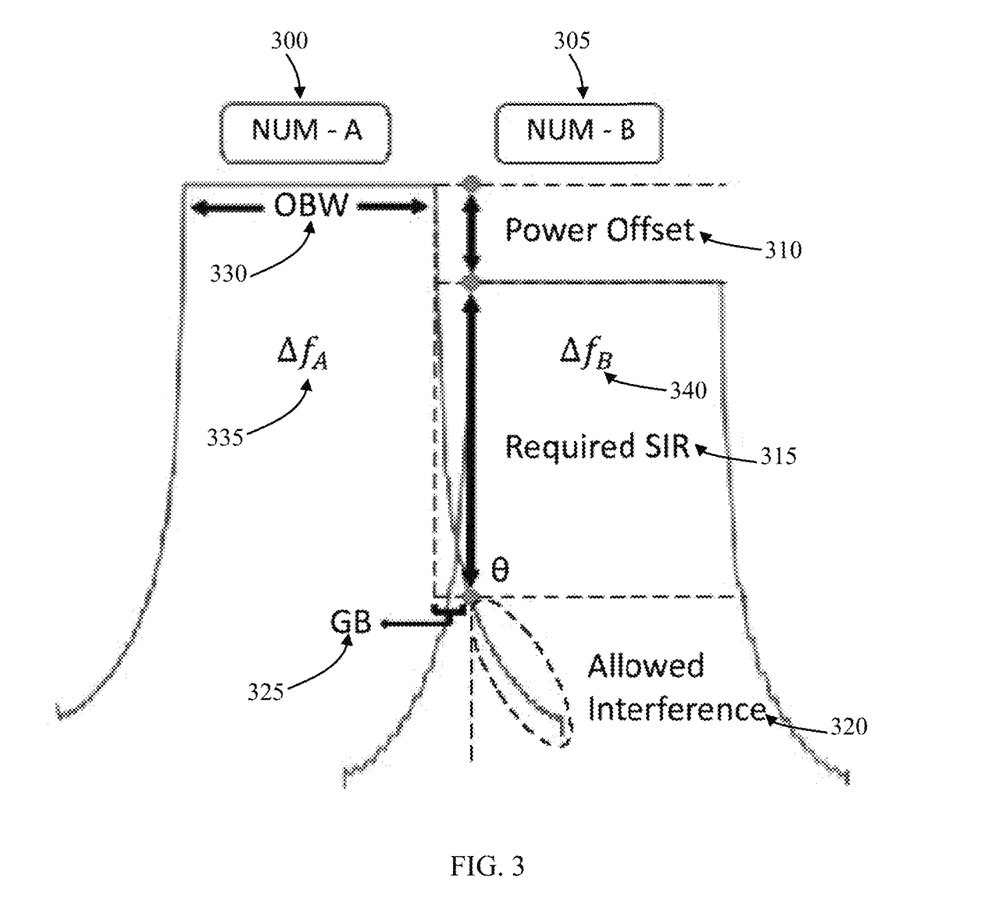
FIG. 3 is an illustration of the guard band allocation between two numerologies considering the allowed interference level (θ) in the adjacent band, in accordance with an embodiment of the present invention.

In a particular embodiment, the adaptive guard concept of the present invention is represented with two numerologies, NUM-A 300 and NUM-B 305, as shown in FIG. 3, and can be generalized to multiple numerologies by considering one pair of numerologies at a time. The threshold for allowed interference level 320 on the adjacent band is represented by θ and it is expressed as follows:

$$\theta_{\Delta f,i} = P_i - P_j + S_j \quad (2)$$

Where $P_i$ represents the in-band power of the interference source, so, $P_i-P_j$ represents the power offset 310 between the bands, $S_j$ denotes the required SIR 315 in the adjacent band. OBW 330 is the occupied bandwidth of NUM-A 300 and $\Delta f_A$ 335 and $\Delta f_B$ 340 indicates the subcarrier spacing of the user NUM-A 300 and the interference source NUM-B 305, respectively. The guards in both the time and frequency domains are utilized regarding $\theta_{\Delta f}$ to achieve the desired SIR level of the numerology on the adjacent band. Throughout the numerical evaluations in this study GD (i.e. $T_{CP-Win}$) and GB 325 are adaptive, and these guards are optimized, as will be described in additional detail below. Also, a multi-window operation is performed in the case of an asymmetric interference scenario, and each side of the spectrum is managed independently, as shown in FIG. 4A and FIG. 4B.

Figure 4A:
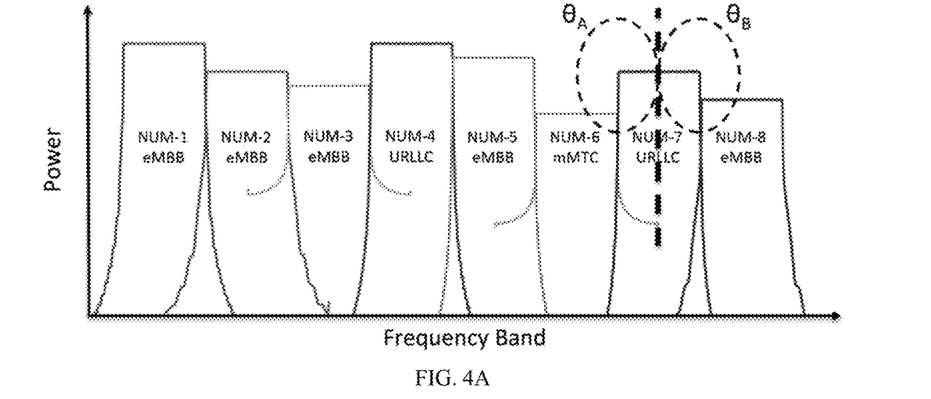
FIG. 4A illustrates random scheduling in an exemplary asymmetric interference scenario in a mixed numerology network.

FIG. 4A illustrates an asymmetric interference scenario ($\theta_A$ 450, $\theta_B$ 455) in a mixed-numerology network. In the present invention, a left window function is utilized to optimize the guard for $\theta_A$ 450 and a right window function is utilized to optimize the guard for $\theta_B$ 455.

Figure 4B:
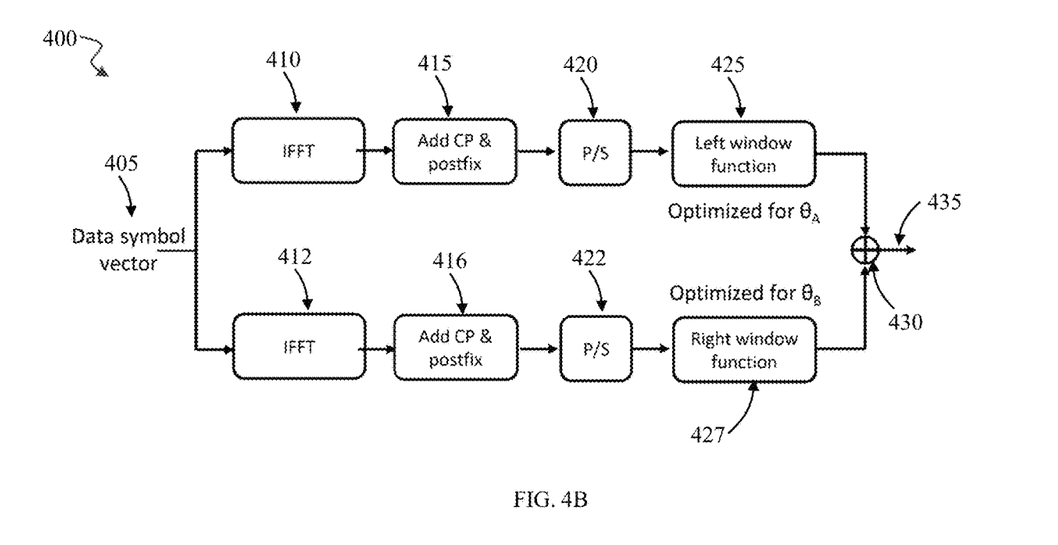
FIG. 4B is a block diagram illustrating a multi-window operation for reducing interference in an asymmetric interference scenario in a mixed numerology network, as illustrated in FIG. 4A, in accordance with an embodiment of the present invention.

FIG. 4B is a block diagram illustrating the multi-window operation, in accordance with an embodiment of the present invention. As shown, an apparatus 400 comprising circuitry for performing the adaptive guard allocation in accordance with the present invention in a non-symmetrical, mixed-numerology system may include circuitry for performing a first Inverse Fast Fourier Transform (IFFT) 410 and a second IFFT 412 upon receiving a received data symbol vector 405. Additional circuitry 415 may be provided for adding a cyclic prefix and postfix to the time domain signal from the first IFFT 410 and circuitry 416 may be provided for adding a cyclic prefix and postfix to the time domain signal from the second IFFT 412. Additional circuitry 420 may be provided for performing parallel to serial (P/S) conversion of the signal 420 and for applying a left window function 425 to generate a guard band and guard duration that is optimized based upon the allowed interference $\theta_A$ 450 of the left side of the spectrum of the user. Additional circuitry 422 may also be provided for performing parallel to serial (P/S) conversion of the signal 422 and for applying a right window function 427 to generate a guard band and guard duration that is optimized based upon the allowed interference $\theta_B$ 455 of the left side of the spectrum of the user. The apparatus 400 may further include circuitry for combining the subcarriers 430 to generate the OFDM symbol 435. In one embodiment, the system of the present invention may be implemented in an OFDM transmitter.

The remaining parameters of the windowed-OFDM (W-OFDM) system are listed in Table I.

TABLE I

SIMULATION PARAMETERS

| Parameter | Value | | | |
|---|---|---|---|---|
| Subcarrier Spacing (kHz) | 15 | 30 | 60 | 120 |
| $T_{OFDM}$ (µs) | 66.7 | 33.3 | 16.7 | 8.3 |
| $T_{CP\text{-}channel}$ (µs) | 4.68 | 2.34 | 1.17 | 0.59 |
| FFT Size | 2048 | | | |
| $CP_{channel}$ Size | 144 | | | |
| # OFDM Symbols | 300 | | | |
| Window Type | Multi-window | | | |
| Window Function | Raised Cosine | | | |

Figure 5:
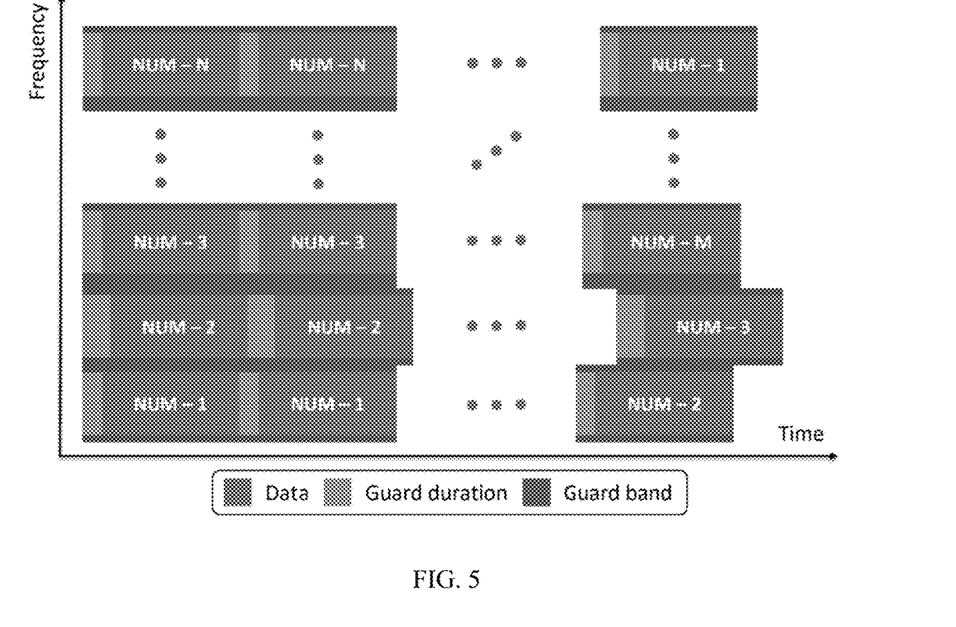
FIG. 5 is an illustration of exemplary frequency domain multiplexed numerologies.

The potential of adaptive guards is increased further through the utilization of an interference-based scheduling algorithm. Considering frequency domain multiplex M asynchronous numerologies, as shown in FIG. 5, different channel conditions, use cases, and system scenarios result in a change in subcarrier spacing, power level and SIR requirements of the numerologies, as previously described. The power level and SIR requirement of each numerology are generated randomly in such a way that θ changes from 0 dB to 60 dB. Also, Δf gets discrete values of {15, 30} kHz and {60, 120} kHz with an equal probability in the frequency range-1 (FR1, a.k.a. sub-6 GHz bands) and frequency range-2 (FR2, a.k.a. millimeter-wave bands), respectively. Assuming that the base station obtains all this necessary information perfectly, it allocates the numerologies to the available sub-bands (out of M! possible arrangements) considering the INI.

Assuming that the data at each subcarrier are statistically independent and mutually orthogonal, the power spectral density (PSD) of an OFDM signal is obtained by summing the power spectra of individual subcarriers, and it is expressed by the following equation:

$$P_f(x) = \frac{\sigma_d^2}{T} \sum_k |G[(f - k\Delta f)T]|^2 \quad (3)$$

Where $\sigma_d^2$ represents the variance of the data symbols, T denotes the symbol duration, k stands for the number of subcarriers, Δf shows the subcarrier spacing and G is the frequency domain representation of pulse shaping window. An OFDM signal is well localized in the time domain with a rectangular pulse shape, which is equivalent to a sinc shape in the frequency domain. The sidelobes of the sincs result in serious OOBE issues, and they should be reduced to prevent interference. Particularly, the frequency domain localization is crucial for asynchronous transmissions across adjacent sub-bands and peaceful coexistence with other numerologies in the OFDM communication network. The sidelobes of the RC function are controlled with the parameter α as shown in the following relationship:

$$G = \frac{\sin(\pi fT)}{\pi fT} \frac{\cos(\pi \alpha FT)}{1 - (2\alpha fT)^2} \quad 0 \leq \alpha \leq 1 \quad (4)$$

Figure 6A:
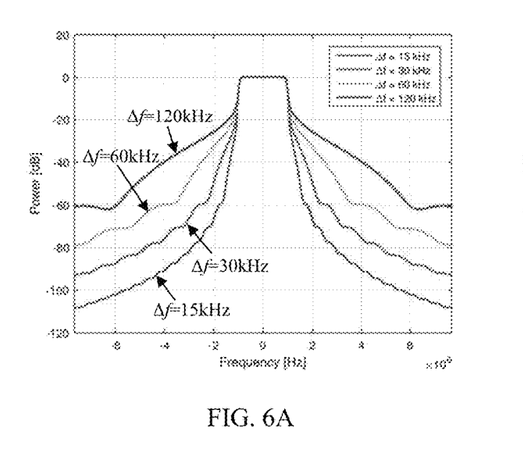
FIG. 6A illustrates an exemplary PSD of a W-OFDM signal, relative to the subcarrier spacing $\Delta f$, wherein $\alpha$ is fixed at 0.03, in accordance with an embodiment of the present invention.
Figure 6B:
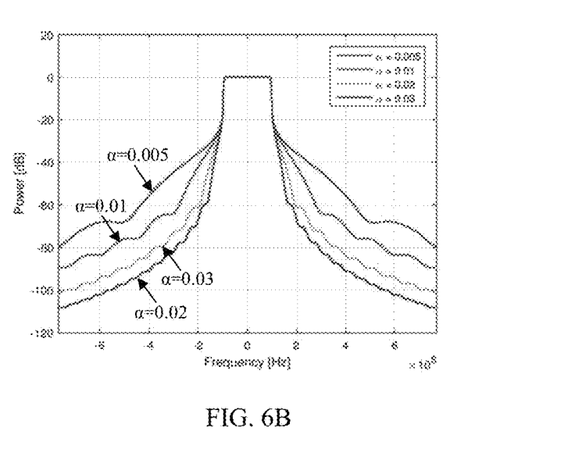
FIG. 6B illustrates an exemplary PSD of a W-OFDM signal, relative to $\alpha$, wherein $\Delta f$ is fixed at 15 kHz, in accordance with an embodiment of the present invention.

Eq. 3 and Eq. 4 show that the parameters T (i.e., Δf=1/T) and α have an important effect on the PSD (Power Spectral Density) of W-OFDM. FIG. 6A and FIG. 6B illustrate the effect of these parameters on the PSD, separately. The effect of Δf on the FSD of the W-OFDM symbol is shown in FIG. 6A and the effect of α (Δf is fixed at 15 kHz) is shown in FIG. 6B.

Figure 7:
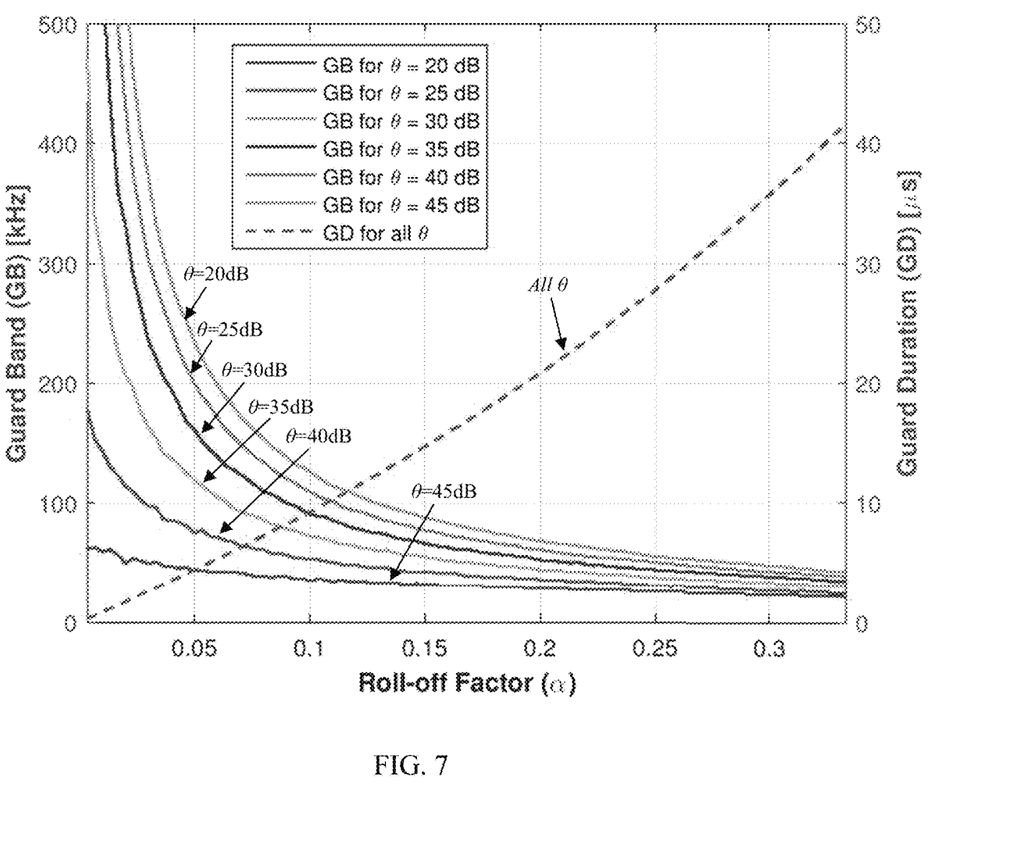
FIG. 7 illustrates the required guard band (GB) and guard duration (GD) pairs to achieve selected $\theta$ levels for a W-OFDM signal with Δf is fixed at 15 kHz, in accordance with an embodiment of the present invention.

In a mixed numerology network, the INI can be managed by windowing operations and by allocating guard band between adjacent numerologies as previously described. Since the windowing operation reduces the OOBE with a cost of extra guard duration, the INI management procedure boils down to the adaptive utilization of guard duration (GD) and guard band (GB) to achieve a desired interference threshold (θ). FIG. 7 demonstrates the required GB and GD amounts for selected θ values considering a W-OFDM signal with Δf=15 kHz. Each α value in the figure represents a GD allocation to carry out the windowing operation and a GB allocation to handle the rest of the interference for a given θ.

A tremendous time-frequency resource is required to deal with the INI issue only with GB or GD allocation. Hence, GB and GD have to be jointly optimized in order to improve the spectral efficiency, which is measured as the information rate that can be transmitted over a give bandwidth. This hyper-parameter optimization has been carried out by a grid search method through a manually designated subset of the hyper-parameter space. The spectral efficiency (η) is proportional to the multiplication of efficiencies in the time and frequency domains, which are calculated as follows:

$$\eta_{time} = \frac{T_{OFDM}}{T_{OFDM} + T_{CP-Ch} + T_{CP-Win}} \quad (5)$$

$$\eta_{freq} = \frac{OBW}{OBW + (GB \times 2)} \quad (6)$$

Considering $T_{OFDM}$, $T_{CP\text{-}Ch}$, and occupied bandwidth (OBW) are fixed parameters for a given Δf, the degrees of freedom that can be selected independently becomes only GB and GC (i.e., $T_{CP\text{-}Win}$). The optimization problem that looks for the optimal GB and GD pair can be defined as follows:

$$(GB, GD) = \underset{GB,GD}{\mathrm{argmax}}(\eta_{time} \times \eta_{freq}), \quad (7)$$

$$\text{Subject to: } P_i - P_j + S_j \leq \theta_{\Delta f,i}. \quad (8)$$

Figure 8:
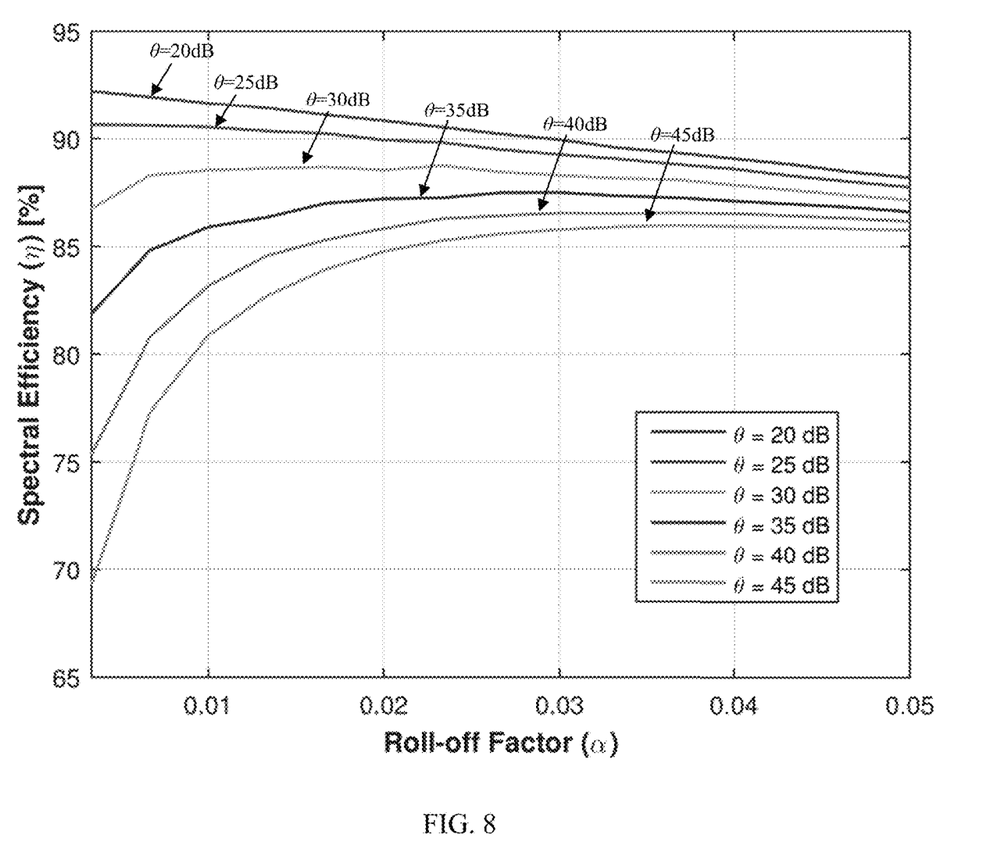
FIG. 8 illustrates the spectral efficiency (η) of the GB and GD pairs that achieve selected $\theta_{\Delta f=15\ kHz}$, wherein each α corresponds to a GB-GD pair.

The spectral efficiencies for selected θ values are shown in FIG. 8. Each α value in the figure is equivalent to a GB-GD pair for a given θ, and the peak value of each curve determines the optimal pair. These optimal pairs are summarized in Table II, along with the related parameters for various Δf. The results reveal that the need for windowing diminishes as θ decreases, and accordingly, the desired interference level can be accomplished with only a few guard carriers. Also, the spectral efficiency increases with the decrease in θ. The change in required guards clearly confirms that the adaptive guard design enhances the spectral efficiency significantly compared to designing the mixed numerology system considering the worst case scenario (e.g., $\eta_{\theta=45\ dB}$=85.98% whereas $\eta_{\theta=20\ dB}$=92.53%).

TABLE II

OPTIMAL GUARD DURATION (GD) AND GUARD BAND (GB) PAIRS FOR SELECTED θ

| θ [dB] | Δf = 15 kHz | | | | Δf = 30 kHz | | | | Δf = 60 kHz | | | | Δf = 120 kHz | | | |
|---|---|---|---|---|---|---|---|---|---|---|---|---|---|---|---|---|
| | α | GD [μs] | GB [kHz] | η [%] | α | GD [μs] | GB [kHz] | η [%] | α | GD [μs] | GB [kHz] | η [%] | α | GD [μs] | GB [kHz] | η [%] |
| 20 | 0.0000 | 0.00 | 74.88 | 92.53 | 0.0000 | 0.00 | 154.44 | 92.50 | 0.0000 | 0.00 | 249.83 | 92.68 | 0.0000 | 0.00 | 557.22 | 92.59 |
| 25 | 0.0033 | 0.23 | 210.11 | 90.65 | 0.0033 | 0.11 | 390.13 | 90.83 | 0.0033 | 0.06 | 857.94 | 90.60 | 0.0033 | 0.03 | 1582.9 | 90.79 |
| 30 | 0.0233 | 1.69 | 217.33 | 88.75 | 0.0167 | 0.60 | 534.34 | 88.79 | 0.0167 | 0.30 | 1037.3 | 88.88 | 0.0167 | 0.15 | 2121.9 | 88.81 |
| 35 | 0.0300 | 2.21 | 272.87 | 87.51 | 0.0267 | 0.98 | 609.44 | 87.47 | 0.0300 | 0.55 | 1083.9 | 87.53 | 0.0267 | 0.24 | 2426.1 | 87.49 |
| 40 | 0.0367 | 2.70 | 306.71 | 86.57 | 0.0300 | 1.11 | 715.19 | 86.59 | 0.0333 | 0.62 | 1318.6 | 86.58 | 0.0367 | 0.34 | 2449.7 | 86.57 |
| 45 | 0.0367 | 2.70 | 360.58 | 85.98 | 0.0367 | 1.35 | 722.70 | 85.98 | 0.0367 | 0.68 | 1434.8 | 86.01 | 0.0367 | 0.34 | 2886.1 | 85.98 |

As shown above, the total guard amount is reduced with the joint optimization of guard band (GB) and guard duration (GD) for a given interference threshold $\theta_{\Delta f}$. The optimization results show that the spectral efficiency (η) decreases as θ increases. For example, the numerologies with larger subcarrier spacing (Δf) require more guards, and they lead to lower η values in a mixed numerology network. Since θ depends on the numerologies operating in the adjacent bands, the potential of adaptive guards can be enhanced further along with the utilization of an interference-based scheduling algorithm.

The proposed scheduling methodology of the present invention groups the numerologies and allocates them to the available sub-bands considering the inter-numerology interference (INI). Therefore, the need for guards in the available spectrum is reduced significantly. The steps of the proposed scheduling method include: (1) Sort the numerologies regarding their subcarrier spacing (Δf) value in an ascending/descending order, (2) Calculate the similarity metric for all numerologies as $\beta_j=SIR_j-P_j$, (3) Sort β in an ascending/descending order for the numerologies with the same subcarrier spacing (Δf), (4) If β value repeats, sort based on power in the adjacent band, and (5) Check P on both side of the available band. If P is the same as the numerology in its adjacent band, allocate the numerology with the higher SIR requirement to the edge.

When the numerologies with similar subcarrier spacing, power level, and SIR requirements are arranged together, the mean θ in the network decreases. Consequently, the need for guards is reduced and the spectral efficiency improves.

Consider an example scenario with eight numerologies, where the numerologies have various subcarrier spacing, power level and SIR requirements, as listed in Tables III and IV.

TABLE III

KEY PARAMETERS OF RANDOMLY SCHEDULED NUMEROLOGIES FOR GUARD ALLOCATION

| Band | 1 | 2 | 3 | 4 | 5 | 6 | 7 | 8 |
|---|---|---|---|---|---|---|---|---|
| Numerology ID | 1 | 2 | 3 | 4 | 5 | 6 | 7 | 8 |
| Δf [kHz] | 30 | 15 | 15 | 30 | 15 | 15 | 30 | 15 |
| Req. SIR [dB] | 20 | 20 | 20 | 25 | 20 | 25 | 35 | 20 |
| Rx Power [dBm] | 0 | −10 | −15 | 0 | −5 | −25 | −10 | −20 |
| Power Offset [dB] | 10 | −10, 5 | −5, −15 | 15, 5 | −5, 20 | −20, −15 | 15, 10 | −10 |
| Intf. Thr. ($\theta_A$, $\theta_B$) [dB] | 30 | 10, 25 | 15, 10 | 35, 25 | 20, 45 | 0, 20 | 40, 30 | 25 |

TABLE IV

KEY PARAMETERS OF INTERFERENCE-BASED SCHEDULED NUMEROLOGIES FOR GUARD ALLOCATION

| Band | 1 | 2 | 3 | 4 | 5 | 6 | 7 | 8 |
|---|---|---|---|---|---|---|---|---|
| Numerology ID | 7 | 4 | 1 | 5 | 2 | 3 | 8 | 6 |
| Δf [kHz] | 30 | 30 | 30 | 15 | 15 | 15 | 15 | 15 |
| Req. SIR [dB] | 35 | 25 | 20 | 20 | 20 | 20 | 20 | 25 |
| Rx Power [dBm] | −10 | 0 | 0 | −5 | −10 | −15 | −20 | −25 |
| Power Offset [dB] | −10 | 10, 0 | 0, 5 | −5, 5 | −5, 5 | −5, 5 | −5, 5 | −5 |
| Intf. Thr. ($\theta_A$, $\theta_B$) [dB] | 15 | 45, 20 | 25, 25 | 15, 25 | 15, 25 | 15, 25 | 15, 30 | 15 |

Figure 9:
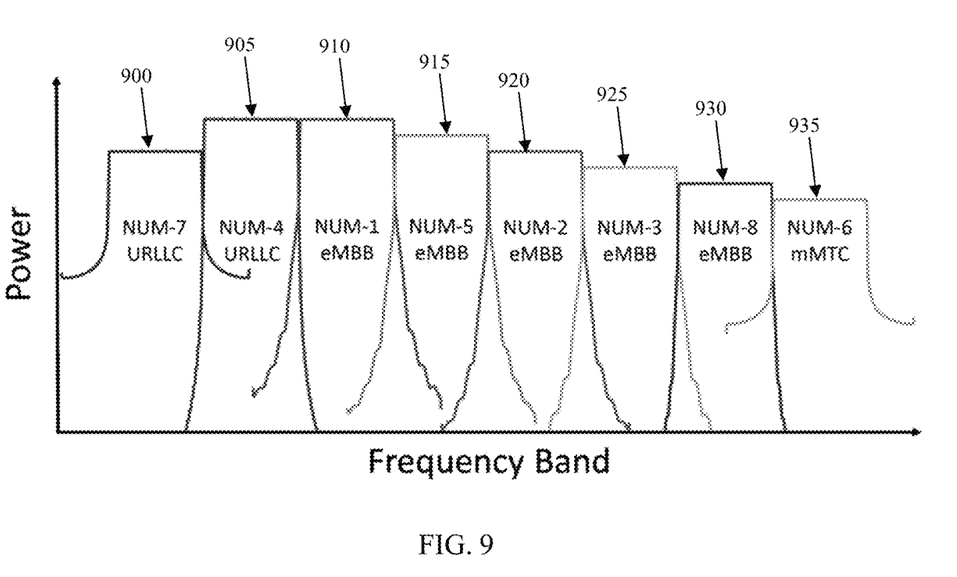
FIG. 9 is an illustration of interference-based (intelligent) scheduling of eight users which have different requirements, in accordance with an embodiment of the present invention.

In this exemplary embodiment, the numerologies are allocated to the bands with two distinct approaches. In the first method, a random scheduling strategy is implemented (as shown in FIG. 4), whereas the interference based scheduling strategy of the present invention implemented in the second method, as shown in FIG. 9. As shown in FIG. 9, first the numerologies are sorted in descending order based upon their subcarrier spacing (Δf). Additionally, NUM-7 900 and NUM-4 905 are grouped together because they have a similar numerology (URLLC), NUM-1 910, NUM-5 915, NUM-2 920, NUM-3 925 and NUM-8 930 are also grouped together because they have a similar numerology (eMBB). Additionally, within the URLLC grouping, NUM-7 900 is placed before NUM-4 905 because similarity metric is larger for NUM-7 900 than for NUM-4 905. A similar process is following with the eMBB grouping to performed the interference-based scheduling in accordance with the present invention.

To compare and demonstrate the effect of the adaptive guards, a fixed guard assignment strategy is realized with the random scheduling method as well. In this embodiment, the guards are allocated assuming the worst case scenario (i.e., highest $\theta_{A'}$) in the fixed assignment strategy.

The numerical evaluation results for various guard assignment strategies, which include (1) the fixed guard assignment with random scheduling, (2) the adaptive guard assignment with random scheduling and (3) the adaptive guard assignment with interference-based scheduling of the present invention, are presented in Table V.

TABLE V

SPECTRAL EFFICIENCY COMPARISON FOR VARIOUS GUARD ALLOCATION STRATEGIES

| | Total Guard Duration [μs] | | Total Guard Band [kHz] | | Spectral Efficiency [%] | |
|---|---|---|---|---|---|---|
| Scenario | FR1 | FR2 | FR1 | FR2 | FR1 | FR2 |
| Fixed Guards & Random Scheduling | 16.08 | 4.12 | 5018.4 | 1927.4 | 81.22 | 77.35 |
| Adaptive Guards & Random Scheduling | 9.09 | 2.24 | 3335.7 | 1310.2 | 85.32 | 82.19 |
| Adaptive Guards & Intf-based Scheduling | 8.15 | 2.06 | 2428.8 | 971.9 | 87.10 | 84.65 |

The results in Table V demonstrate that the GD and GB amounts are reduced by 43% and 34%, respectively when the fixed guards are changed with the adaptive guards in the frequency range-1 (FR1) case. Also, the GD and GB amounts are reduced further by 10% and 27%, respectively when the random scheduling strategy is replaced by the interference-based scheduling strategy of the present invention. It is worth noting that spectral efficiency (η) is lower in the frequency range-2 (FR2) case since more guards are required for the numerologies with higher Δf values. Although, it can be compensated for with an increased number of subcarriers (FR2 is suitable for wider bands), it is kept as fixed for a fair comparison with the FR1 case in the numerical evaluations.

The present invention provides a system and method for adaptive guard utilization combined with a multi-window operation that is proposed to solve the INI problem that exists in a mixed numerology communication system. In embodiments of the invention, the guards in both time and frequency domains are jointly optimized considering the numerology, use case (i.e., service requirement), and power offset between the numerologies. Moreover, the potential of adaptive guards is further increased with an interference-based scheduling algorithm. The proposed approach arranges the numerologies in such a way that the need for guards in the available spectrum decreases. The interference-based scheduling strategy is particularly important when there is a serious power imbalance between the numerologies. The current mobile networks adopted a power control mechanism to manage interference between neighboring bands. However, this solution restricts the UEs with better channel conditions to deploy higher order modulations. The proposed adaptive guard utilization may lead to relax the power control mechanism and improve the throughput.

The results show that the precise design that accommodates such flexibility reduces the guards significantly and improves the spectral efficiency of mixed numerology systems. Despite the fact that the computational complexity increases compared to traditional OFDM-based systems, the computation of the optimal GB-GD pairs is an offline action requiring a onetime calculation. Therefore, a lookup table procedure can be used to decrease complexity. Additionally, the proposed guard utilization is application to other pulse-shaped OFDM systems.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for improved OFDM signal transmission in a multi-user, mixed-numerology OFDM communication system, the method comprising:
   identifying a power offset (PO) between a plurality of users operating in adjacent bands of an OFDM-based communication system;
   identifying a required signal-to-interference ratio (SIR) for each of the plurality of users;
   identifying a numerology associated with each of the plurality of users;
   determining an allowed interference level for each of the plurality of users;
   optimizing a guard band and a guard duration for each of the plurality of users based upon the identified power offset, the identified required signal-to-interference ratio (SIR) and the numerology associated with each of the plurality of users, wherein optimizing the guard band and the guard duration for each of the plurality of users further comprises maximizing a spectral efficiency of the OFDM signal, wherein the spectral efficiency is maximized when the power offset (PO) of the user combined with the signal-to-interference ratio (SIR) of the user is less than the allowed interference level for the user relative to a subcarrier spacing from the identified numerology; and
   generating an OFDM signal using the optimized guard bands and the optimized guard duration for each of the plurality of users to reduce interference caused by users operating in the adjacent bands of the OFDM-based communication system.

2. The method of claim 1, wherein a first user operating in a first band adjacent to one of the plurality of users uses a first numerology and a second user operating in a second band adjacent to the user uses a second numerology, wherein the first numerology is different than the second numerology thereby resulting in asymmetric interference, the method further comprising, optimizing a first guard band and guard duration for the first band and optimizing a second guard band and guard duration for the second band to independently address the asymmetric interference.

3. The method of claim 1, further comprising performing a windowing function for each of the plurality of users based upon the optimized guard band and the optimized guard duration.

4. The method of claim 1, further comprising storing the guard band and the guard duration for each of the plurality of users in a lookup table.

5. The method of claim 1, further comprising performing interference-based scheduling for each of the plurality of users prior to generating the OFDM signal.

6. The method of claim 5, wherein performing interference-based scheduling for each of the plurality of users, further comprises:
   grouping users with similar received power levels, similar signal-to-interference ratios (SIR) and similar numerologies adjacent to each other.

7. The method of claim 6, wherein performing interference-based scheduling for each of the plurality of users, further comprises:
   ordering the users in an ascending or descending order based upon a subcarrier spacing from their identified numerology;
   calculating a similarity metric for each of the plurality of users, wherein the similarity metric for each user of the plurality of users is equal to a difference between the signal-to-interference ratio (SIR) of the user and the received power level of the user;
   ordering the users in an ascending or descending order based upon the similarity metric for the same numerology, and in the case of matching similarity metrics, further ordering the users based upon the power level of adjacent users; and
   comparing the received power level on both sides of the user and if the received power level on both sides of the user is the same, positioning the user with the higher signal-to-interference ratio (SIR) to a frame edge of the OFDM symbol.

8. The method of claim 1, wherein the numerology of the user is selected from enhanced mobile broadband (eMBB), massive machine type communications (mMTC), and ultra-reliable low-latency communications (URLLC).

9. An apparatus, comprising one or more integrated circuit devices configured to:
   receive a data symbol vector comprising data mapped to a subcarrier associated with one of a plurality of users operating in adjacent bands of an OFDM-based communication system;
   identify a power offset (PO) between a plurality of users operating in adjacent bands of an OFDM-based communication system;
   identify a required signal-to-interference ratio (SIR) for each of the plurality of users;
   identify a numerology associated with each of the plurality of users;
   determine an allowed interference level for each of the plurality of users;
   optimize a guard band and a guard duration for each of the plurality of users based upon the identified power offset, the identified required signal-to-interference ratio (SIR) and the numerology associated with each of the plurality of users, wherein the guard band and the guard duration are optimized when a spectral efficiency of the OFDM signal is maximized and wherein the spectral efficiency is maximized when the power offset (PO) of the user combined with the signal-to-interference ratio (SIR) of the user is less than the allowed interference level for the user relative to a subcarrier spacing from the identified numerology; and
   generate an OFDM signal using the optimized guard bands and the optimized guard duration for each of the plurality of users to reduce interference caused by users operating in the adjacent bands of the OFDM-based communication system.

10. The apparatus of claim 9, wherein a first user operating in a first band adjacent to one of the plurality of users uses a first numerology and a second user operating in a second band adjacent to the user uses a second numerology, wherein the first numerology is different than the second numerology thereby resulting in asymmetric interference, wherein the one or more integrated circuit devices are further configured to, optimize a first guard band and guard duration for the first band and to optimize a second guard band and guard duration for the second band to independently address the asymmetric interference.

11. The apparatus of claim 9, wherein the one or more integrated circuit devices are further configured to perform a windowing function for each of the plurality of users based upon the optimized guard band and the optimized guard duration.

12. The apparatus of claim 9, wherein the one or more integrated circuit devices are further configured to perform interference-based scheduling for each of the plurality of users prior to generating the OFDM signal.

13. The apparatus of claim 9, wherein the one or more integrated circuit devices are further configured to group users with similar received power levels, similar signal-to-interference ratios (SIR) and similar numerologies adjacent to each other.

14. The apparatus of claim 9, wherein the one or more integrated circuit devices are further configured to:
   order the users in an ascending or descending order based upon a subcarrier spacing from their identified numerology;
   calculate a similarity metric for each of the plurality of users, wherein the similarity metric for each user of the plurality of users is equal to a difference between the signal-to-interference ratio (SIR) of the user and the received power level of the user;
   order the users in an ascending or descending order based upon the similarity metric for the same numerology, and in the case of matching similarity metrics, further ordering the users based upon the power level of adjacent users; and
   compare the received power level on both sides of the user and if the received power level on both sides of the user is the same, positioning the user with the higher signal-to-interference ratio (SIR) to a frame edge of the OFDM symbol.

15. The apparatus of claim 9, wherein the numerology of the user is selected from enhanced mobile broadband (eMBB), massive machine type communications (mMTC), and ultrareliable low-latency communications (URLLC).

16. A non-transitory computer readable storage medium having computer program instructions stored thereon that, when executed by one or more processors, cause the one or more processors to perform a method of generating an orthogonal frequency division multiplexing (OFDM) symbol for transmission in a communication channel using adaptive guard bands and adaptive guard durations, the method comprising:
   identifying a power offset (PO) between a plurality of users operating in adjacent bands of an OFDM-based communication system;
   identifying a required signal-to-interference ratio (SIR) for each of the plurality of users;
   identifying a numerology associated with each of the plurality of users;
   determining an allowed interference level for each of the plurality of users;
   optimizing a guard band and a guard duration for each of the plurality of users based upon the identified power offset, the identified required signal-to-interference ratio (SIR) and the numerology associated with each of the plurality of users, wherein optimizing the guard band and the guard duration for each of the plurality of users further comprises maximizing a spectral efficiency of the OFDM signal, wherein the spectral efficiency is maximized when the power offset (PO) of the user combined with the signal-to-interference ratio (SIR) of the user is less than the allowed interference level for the user relative to a subcarrier spacing from the identified numerology; and generating an OFDM signal using the optimized guard bands and the optimized guard duration for each of the plurality of users to reduce interference caused by users operating in the adjacent bands of the OFDM-based communication system.

17. The non-transitory computer readable storage medium of claim 16, wherein the method further comprises, wherein a first user operating in a first band adjacent to one of the plurality of users uses a first numerology and a second user operating in a second band adjacent to the user uses a second numerology, wherein the first numerology is different than the second numerology thereby resulting in asymmetric interference, the method further comprising, optimizing a first guard band and guard duration for the first band and optimizing a second guard band and guard duration for the second band to independently address the asymmetric interference.

18. The non-transitory computer readable storage medium of claim 16, wherein the method further comprises performing interference-based scheduling for each of the plurality of users prior to generating the OFDM signal.

* * * * *